June 3, 1969   C. O. CARLSON ET AL   3,448,458
LASER RECORDER WITH SCANNING AND DISPLAY SYSTEMS
Filed June 16, 1967   Sheet 3 of 7

INVENTORS
CARL O. CARLSON
HENRY D. IVES
JOHN L. JONES

BY *Louis A. Kline*
*John T. Matlago*
*Robert L. Harrington*
THEIR ATTORNEYS

INVENTORS
CARL O. CARLSON
HENRY D. IVES
JOHN L. JONES

THEIR ATTORNEYS

United States Patent Office 3,448,458
Patented June 3, 1969

3,448,458
**LASER RECORDER WITH SCANNING
AND DISPLAY SYSTEMS**
Carl O. Carlson, Los Angeles, Henry D. Ives, Redondo
Beach, and John L. Jones, Gardena, Calif., assignors
to The National Cash Register Company, Dayton, Ohio,
a corporation of Maryland
Filed June 16, 1967, Ser. No. 646,561
Int. Cl. G01d 9/42, 15/10
U.S. Cl. 346—17          16 Claims

ABSTRACT OF THE DISCLOSURE

A display system wherein an information bearing laser beam is controlled by three mirror movements to achieve selective localized scanning of a record medium for producing thereon recordings of data greatly reduced in size, e.g., characters having a height of about 100 microns. One of the mirror movements positions the laser beam along the vertical axis of a specified optical field of the recording medium while a second mirror movement positions the laser beam along the horizontal axis of the optical field to a selected position whereat the character is to be recorded. A third mirror movement provides for a short vertical line scanning action at the selected position with means for sweeping the scan lines to form a raster area and thereby permit the laser light beam to produce the desired character on the record medium. The horizontal and vertical positioning movements over the optical field (e.g., a size of about 6.4 by 6.4 millimeters) of the record medium are controlled electronically in a manner whereby the laser beam is very rapidly positioned to the desired position for commencing the scanning operation. The system further incorporates means for bypassing the high speed scanning mirror movement to simply provide line recording capability, means for applying a variety of recording techniques to enable erasing and reusability capability of the record medium, means for projecting the image recording on the record medium onto a viewing screen, and means for recording and storing the data on the record medium in a form that can be read for use in digital computer systems and the like.

Background of invention

This invention relates to display systems and more particularly to a display system wherein a laser beam very rapidly produces data on a small optical field of a record media for projection onto a viewing screen.

An application for visual displays such as contemplated by the present invention is in a military defense system, for example, wherein it is important to locate, identify and track flying objects that may appear at any position within the optical field of the area being viewed on a screen. A prior art display system that has heretofore been used for this application is the Scribe Projection Displays disclosed in the April 1966 issue of Electronic Design News at page 132. Very generally, the recording media in the scribing process comprises an opaque coating on a transparent substrate. A scribing stylus is controllably moved over the recording media to scratch off the opaque coating in the areas representing the desired recording. For viewing the recorded information, a projection light is directed against the recording media which passes therethrough only in the areas where the coating has been removed by the scribing stylus.

A number of disadvantages are encountered with the scribing processes. Once an image is formed on the record media, it cannot be erased, nor is the record media reusable. Such a process having a capability of scribing only about 10 to 20 characters per second is too slow for many real time applications. The present invention is believed to overcome the above disadvantages and to provide many advantages not previously available in its use of laser imaging techniques whereby recording is achieved in a simplified manner at a rate of over 100 characters per second.

Techniques for modifying a recording media with a laser beam are described in the commonly assigned U.S. applications of Carlson et al. entitled "Information Processing Systems Using Lasers," Ser No. 549,281, filed May 11, 1966; and of Carlson entitled "Laser & Film Deformation Recording and Erasing System," Ser. No. 585,060, filed Oct. 7, 1966. In the systems disclosed in the Carlson et al. and Carlson applications, the scanning motion of a modulated laser beam is controlled by two mirror movements. A first mirror movement provides a cyclic lateral scanning movement of the laser beam across the optical field of the recording media, and a second mirror movement (or tilt of the first mirror) provides for the steady vertical advancement of the lateral scanning movement down the optical field to thereby provide for scanning over the entire area covered by the field.

The described systems do not provide for the selective random positioning of the laser beam to any desired point in the field followed by a localized scanning sufficient to record an image of a single character at that position. Rather, the patterns of movement are fixed in the systems described in the above-identified copending applications, and recording of a character at a particular location is achieved only within the established patterns, i.e., only as the laser beam sweeping the field sweeps across the said particular location. Thus, even though it may be desired to record on the recording medium with a single character to be located at a specified position, e.g., a position in the lower right hand corner of the optical field, the beam for the previously described systems is controlled to repeatedly scan across the entire optical field while it sweeps down the field with the image recording process being effective only for a small portion of those bottommost scan lines across the far right side of the optical field. In such instances, only a small fraction of the scanning motion is utilized in the recording process.

Summary of the invention

Whereas in the described methods of scanning the movement of the laser beam is maintained in an established pattern, the preferred system of the present invention includes means for selectively positioning the laser beam at any one of a plurality of coordinate addressable points on the recording medium. In the preferred embodiment, the positioning of the laser beam is accomplished by selective movement of pivotally mounted mirrors. In display systems such as contemplated by the present invention, the recording process is desirably accomplished at a very high rate of speed, e.g., faster than 100 characters per second. In the preferred system, the characters produced on the recording medium are highly reduced, e.g., have a vertical height of about 100 microns. The small size is desired for attaining high recording speed in that there is less surface area that must be affected by the energy of the laser beam to produce a desired character. The recorded character height of 100 microns for achieveing a recording speed of over 100 characters per second in the preferred system is based on the use of a laser having a power output of about 50–90 milliwatts. The same speed can be obtained for characters greater than 100 microns by using a laser with a greater power output. Thus, for example, with a 2-watt laser, the same speed could be obtained for recording characters of about 600 microns in height. Unless stated otherwise, the systems described herein are based on a 50–90 milliwatts laser. However, the larger character recordings may be preferred where projection of the character image onto a large screen requires a maximum of light to be passed through the recording.

Recording of the reduced characters, (e.g., 100 microns) in the correspondingly reduced optical field (e.g., 6.4 by 6.4 millimeters) requires a degree of positioning accuracy that can tolerate only slight overshoot oscillations induced by the very rapid mechanical movements. Awaiting the normal settling of such oscillating motions will produce objectionable delays that will greatly reduce the random character rate. The preferred embodiment of the invention thus further includes means for minimizing the overshoot oscillations to achieve the desired rate of recording. This feature, as well as other features and advantages of the present invention are more specifically described in the following detailed description and drawings wherein:

Figure 1:
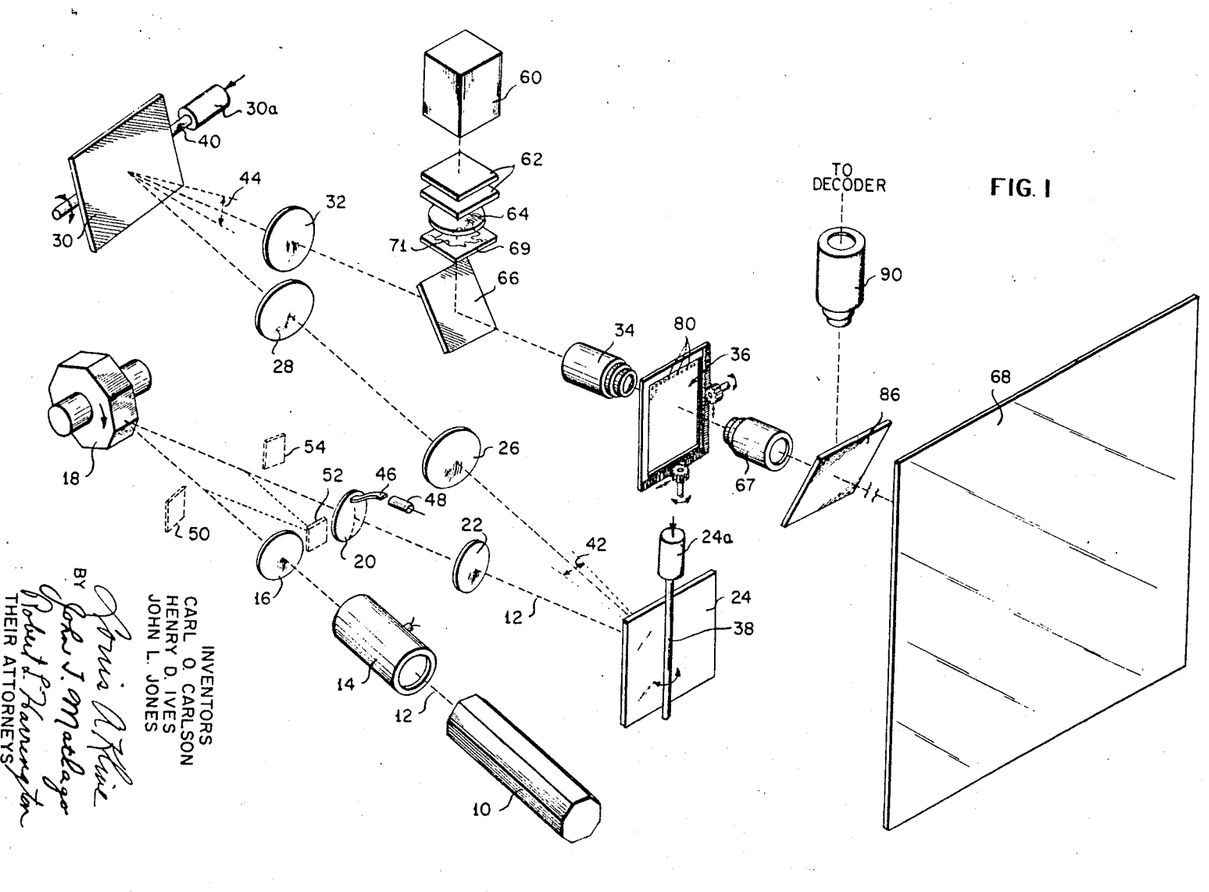
FIG. 1 is a schematic view showing a laser display system in accordance with the present invention.

Referring to FIG. 1 of the drawings, a conventional laser 10 is illustrated which may typically be a continuous-wave laser, oscillating in a single traverse mode and emitting a uniphase wavefront laser beam with a divergence that is preferably substantially diffraction limited so as to permit optimum use of the laser power output. An available laser of this type is a Model 125 helium-neon gas laser manufactured by Spectra-Physics, Inc., of Mountain View, California, having a power output of approximately 50–90 milliwatts, a wavelength of 6,328 angstroms, and a beam divergence of approximately 0.7 milliradian. Another available laser is the 2-watt Argon ion laser, Model 140 also available from Spectra-Physics, Inc.

The laser 10 in FIG. 1 emits a collimated monochromatic linearly polarized output laser beam 12 of high brightness which passes to a modulator 14 such as the Spectra-Physics Model 320 Electro-optic Modulator with Polarization Analyzer. The output laser beam intensity is modulated as it passes through modulator 14 from which it passes through a spot forming lens 16. The beam is then reflected from the rotating polygon mirror 18 into field lens 20 where a spot is formed. The beam is then relayed by relay lens 22 toward mirror 24 which reflects the beam into a field lens 26. From field lens 26 the beam is directed through relay lens 28, reflected off mirror 30 into field lens 32 and then relayed by a recording lens element 34 onto a recording medium 36. The spot formed by the laser beam on the recording medium is highly reduced by the lens system to a size of 4 microns or less.

Mirror 24 is mounted for rotation by drive motor 24a on a vertical axis 38, and mirror 30 is mounted for rotation by drive motor 30a on a horizontal axis 40. As the mirror 24 is pivoted on its axis 38, the beam 12 is displaced horizontally (as indicated by arrow 42) and as the mirror 30 is pivoted on its axis 40, the beam 12 is displaced vertically (as indicated by arrow 44). A control system for the mirrors 24 and 30 is discussed in a later section. By supplying such a control system with appropriate signals, e.g., from a computer, the mirrors are pivotally positioned to locate the impingement of the beam at any addressable point in the optical field of the recording medium.

By rotating the polygon mirror 18, the beam 12 is caused to traverse through a short vertical scanning motion in one direction. FIGS. 4 and 5 are enlarged illustrations of a 6.4 millimeter square area forming an optical field 80 of recording medium 36. The pattern that the laser beam follows in producing the randomly positioned characters L, T and D of FIG. 4 is shown as dash lines 12'. The size of these characters relative to the area 80 is greatly enlarged for purposes of illustration. In the described embodiment wherein the characters are 100 microns in height, as many as 64 columns and 64 rows of characters can be placed on the 6.4 by 6.4 millimeter area providing 4096 addressable x–y coordinate positions. The laser beam is first positioned at an addressable $x_1,y_1$ coordinate position representing the desired starting point $S_L$ by providing the proper rotative signals to the motors 24a and 30a for the respective mirrors 24 and 30. The rotating mirror 18 reflects the beam to produce a short vertical scan line sufficient to cover the vertical height of the characters as shown in the drawing, e.g., a distance of about 100 microns. These scan lines are further illustrated in the greatly enlarged partial view of the recording medium shown in FIG. 10. The mirror 24 is programmed to produce a small horizontal sweeping motion to cause a small raster of vertical scans across the area whereat the character L is to be produced. The modulator 14 is controlled by well-known control means to pass the laser beam at the appropriate times during the scanning motion to produce the L character.

Upon completion of the L character, the respective motors for mirrors 24 and 30 are programmed to rapidly move the laser beam directly to a second addressable $x_2,y_2$ coordinate position representing the desired starting point $S_T$ for recording the character T. The scanning motion of polygon mirror 18 together with the small horizontal sweeping movement provided by mirror 24 produces the scanning raster for recording the character T. Upon completion of the T character, mirrors 24 and 30 are programmed to position the laser at point $S_D$ for recording the next character D (shown in the drawing as being only partially completed).

FIG. 5 illustrates the typewriter mode of recording. In this mode of operation, preferably the mirror is programmed to automatically sweep across the successive character positions comprising a row and then to shift to the first character position of the next row and continue across that row, etc. Whereas lateral movement of the laser beam by mirror 24 is along the rows, and vertical movement by mirror 30 is along the columns of the optical field, the drive means for mirrors 24 and 30 are sometimes referred to hereafter a row drive means and column drive means, respectively, with the various components for the row and column drive means being correspondingly identified.

Figure 2:
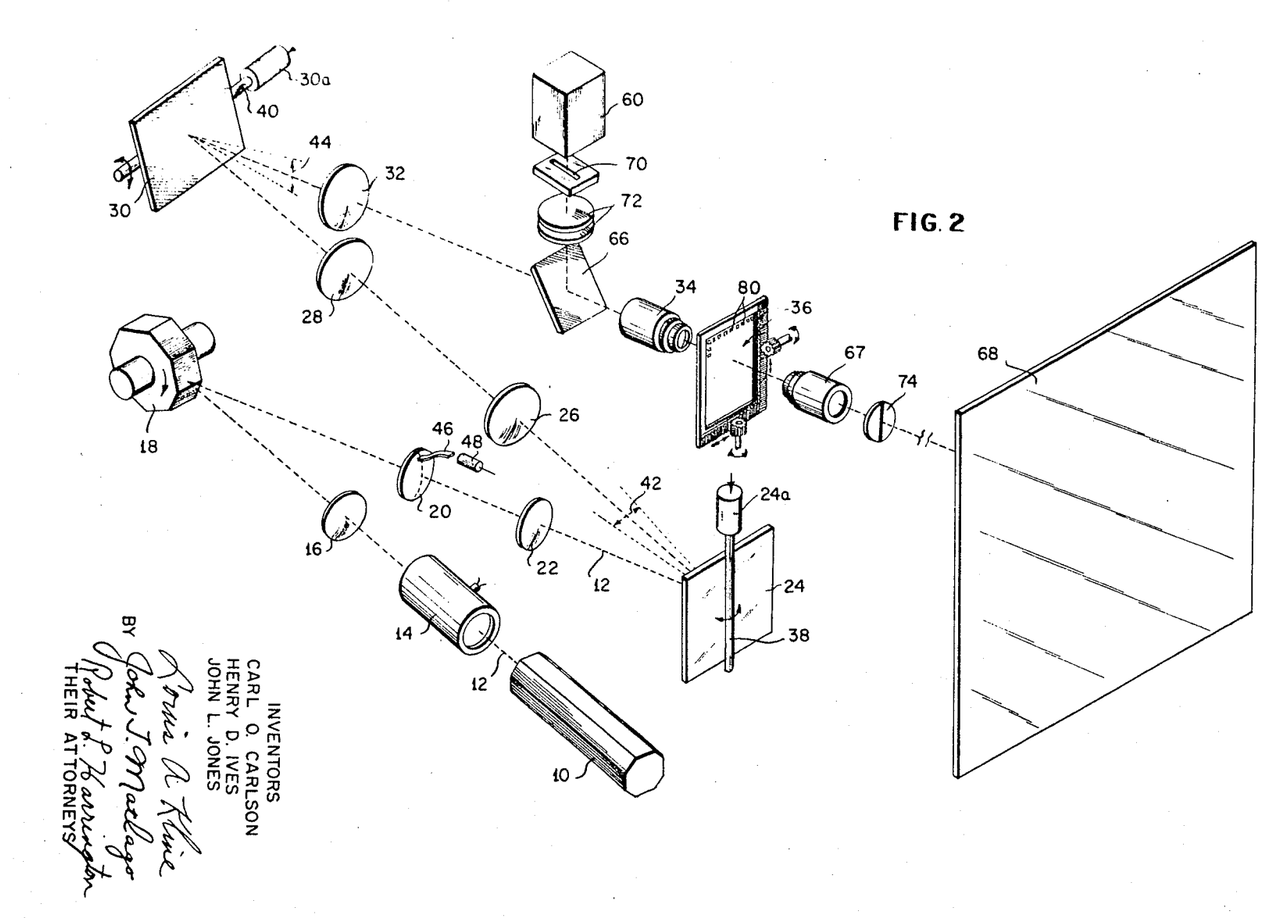
FIG. 2 is a schematic view showing a laser display system in accordance with the present invention, similar to FIG. 1 but including certain modifications.
Figures 3, 6, 10:
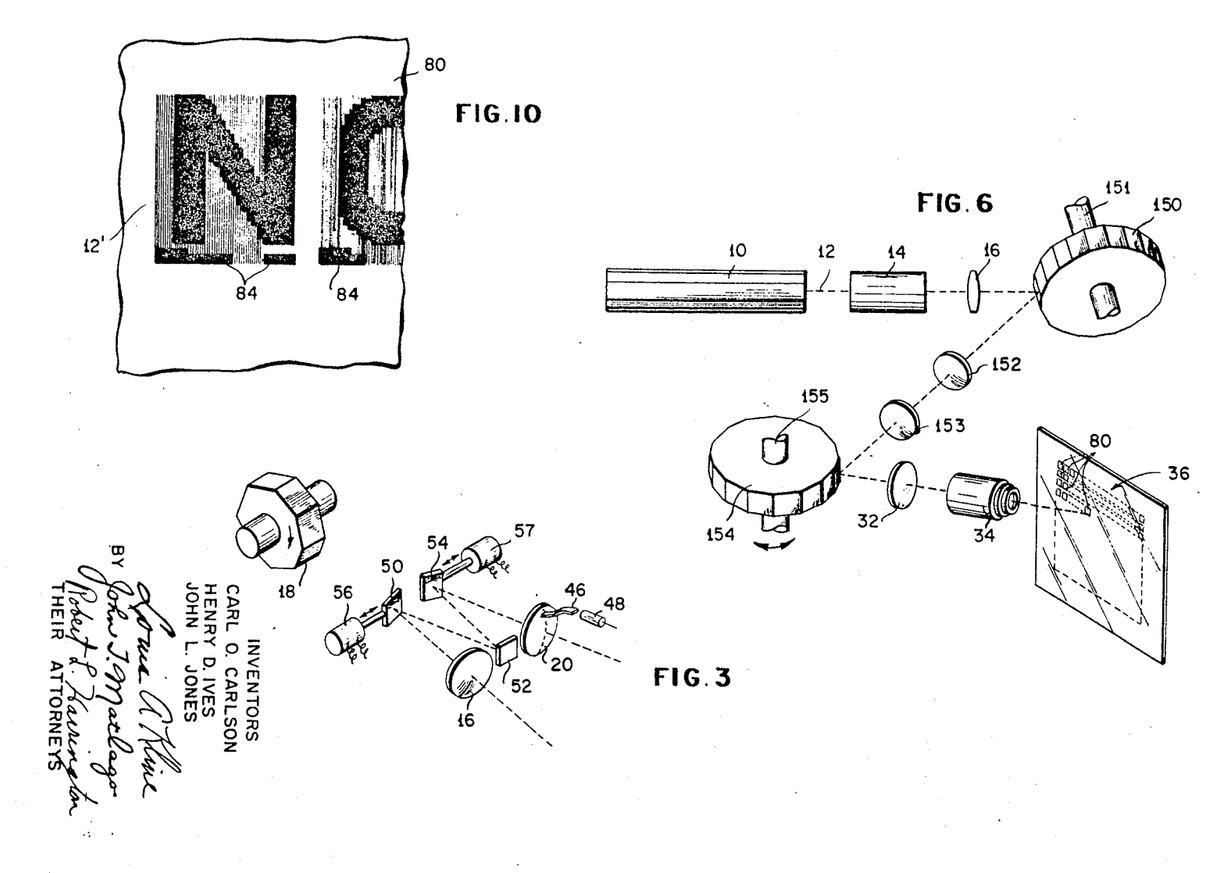
FIG. 3 shows a feature for bypassing the scanning mirror, which feature is indicated in FIG. 1 by dotted lines.
FIG. 6 is a schematic view showing another embodiment of a laser display system in accordance with the present invention.
FIG. 10 is an enlarged view of a portion of the recorded area of the recording medium illustrating a reduced character recorded thereon.
Figures 4, 5, 9:
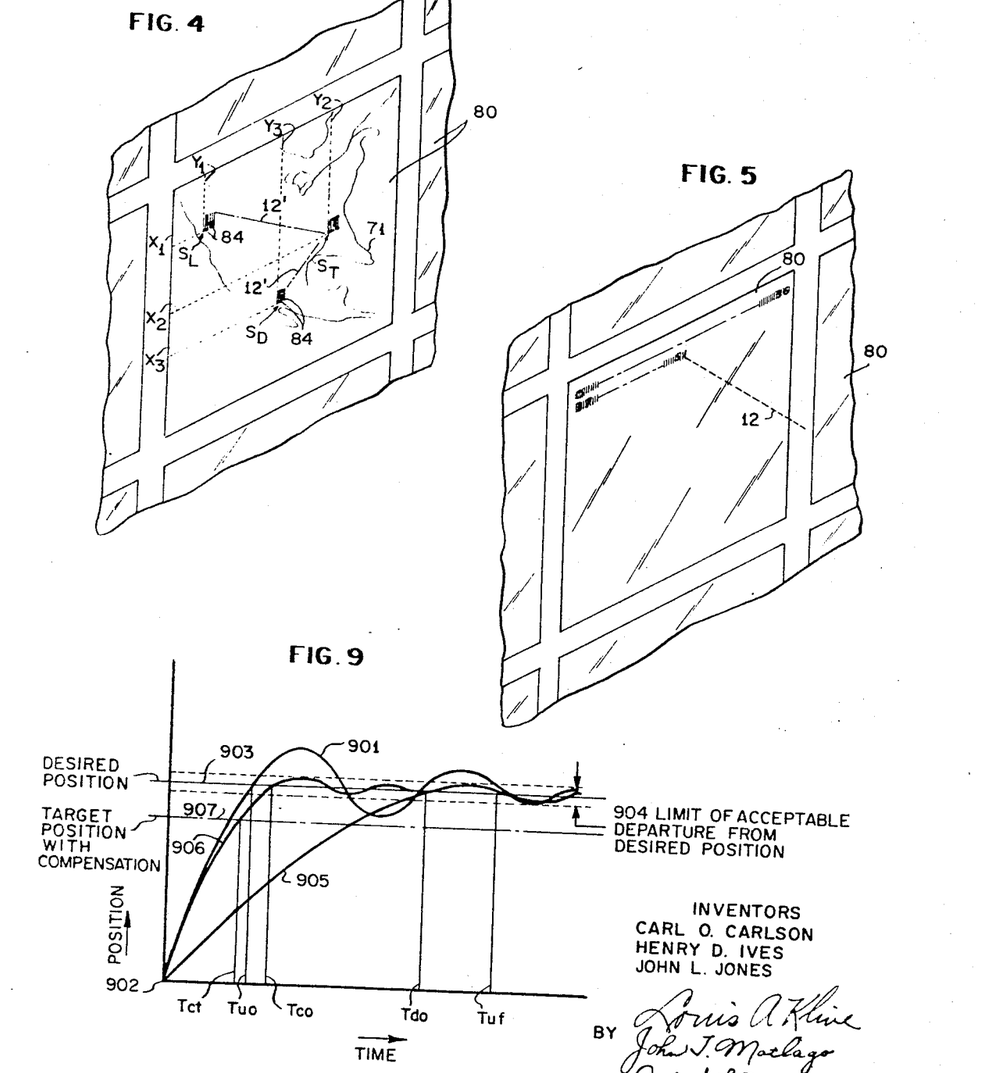
FIG. 4 is an enlarged view of a recorded area of the recording medium of the display systems of FIGS. 1 and 2 showing a random mode of recording operation.
FIG. 5 is an enlarged view of another recorded area of the recording medium showing a typewriter mode of recording operation.
FIG. 9 is a graph demonstrating one feature of the system of FIG. 8 in controlling overshoot oscillation that is induced by rapid positioning of the mirrors.

In those applications where the principal function of the recording operation is to record data in the typewriter mode, it may be desired to incorporate the three mirror movements into a dual polygon mirror arrangement such as illustrated in FIG. 6. Similar to the systems of FIGS. 1 and 2, a laser 10 emits a laser beam 12 that is modulated by modulator 14 and directed through a lens 16 onto the mirror faces of a polygon mirror 150, pivotally mounted on a horizontal axis 151. It may contain, for example, 20 mirror faces, and be rotatively driven by an air motor at 180,000 r.p.m. to produce rapid vertical scanning motion for the laser beam. The vertically scanning beam is directed by the polygon mirror 150 through lenses 152 and 153 onto a second polygon mirror 154. The second polygon mirror 154 is rotatively mounted on a vertical axis 155 for horizontal rotation and is coordinated with the rotation of the first polygon mirror 150 to produce a slower horizontal sweeping movement for the scanning motion. The beam is passed through field lens 32 and recording element 34 onto recording medium 36.

Each face of the second polygon 154 sweeps the beam to form a scanning raster across the optical field 80 of the recording media 36 for recording an entire row of characters. Each successive mirror face shifts the scanning raster to the next row, e.g., by providing well-known means to tilt or pivot the axis 155, or by constructing the polygon so that each face is set at an angle to the preceding mirror face. Thus, one revolution of the second polygon 154 will produce as many rows of characters as there are mirror faces on the polygon. As adapted to the typewriter mode of recording, this process has the desired advantage of being very fast.

The successive mirror faces of the polygon mirror 18, as shown in FIG. 1, produce the desired scan lines by reflecting the laser beam as a continuous series of short downward strokes. A light guide 46 is mounted on lens 20 to intercept the laser beam at the uppermost point of each downward stroke and divert the beam to a photo diode 48. The photo diode 48 is activated by the light exposure to produce a scan sync pulse that synchronizes the writing operation of the laser beam with a character generator 104 (FIG. 7), as described hereafter, to produce the desired recording.

There are a number of applications for the laser beam where the scanning movement produced by polygon mirror 18 is not wanted, e.g., where it is desired to generate a line between two points on the field displayed. In such applications it is desired to record by simple rotative control of vertical and horizontal beam positioning mirrors 24 and 30 which control is described in more detail later. To provide for such non-scanning projection, the polygon mirror 18 is bypassed. As shown in FIG. 3 (see also FIG. 1), the beam 12 is interrupted before it strikes the polygon mirror 18 by a retractable mirror 50. Mirror 50 reflects the beam onto mirror 52 which directs the light beam toward retractable mirror 54 which places the beam back into its original path after having bypassed the polygon mirror 18, e.g., the light beam is reflected off mirror 54 and through lens 20. Rapid insertion and removal of the mirrors is possible in a variety of ways known to the art as, for example, by the electrically actuated magnetic solenoids 56 and 57 illustrated in FIG. 3.

In order to suppress the detrimental tendency of the laser beam to move around on the mirror faces, relay lenses 22 and 28 are arranged to also image the virtual useful apertures of mirrors 18 and 24 (as seen through field lenses 20 and 26) onto mirrors 24 and 30, respectively. The real useful aperture of mirror 30 is imaged directly by field lens 32 to fill the aperture of recording lens 34. This arrangement permits some beam wander over the relay lens apertures. These are designed to be large enough to capture the beam at all beam positions.

Projection mechanism

In one form of recording the highly focused, high energy laser beam functions to produce a character on a recording medium, e.g., in the form of a 2 micron film on a transparent substrate, by a laser heat mode recording process as disclosed in the previously mentioned Carlson et al. application Ser. No. 549,281. A projection means for projecting such a recorded character onto a viewing screen is illustrated in FIG. 1. A light source 60 directs a light beam through a set of removable filters 62 for filtering out any frequencies of the light source that might have a deleterious effect on the recording medium 36 and then through a condenser lens 64. The light is directed from condenser lens 64 toward a dichroic beam combiner 66 where it is reflected toward the pupil of recording lens 34. The projection light is then passed through the recording media 36 and the image that is contained thereon is cast into a projection lens 67 which directs the image-bearing light beam onto a display screen 68. It may be desired to project a stationary reference map or the like onto the viewing screen to provide a background for the displayed characters. Such can be introduced by transparency 69 bearing a map 71 positioned immediately following lens 64, as shown in FIG. 1.

Other types of laser recording involve film deformation. Such a process is described in the above mentioned Carlson application, Ser. No. 585,060. Briefly, such recording is achieved from discoveries that a high energy laser scanning beam of small diameter is capable of directly forming a deformation in a thermoplastic film without having to provide an electrical charge pattern. Erasing of the film deformation recording may be accomplished by recording over the character to be erased using a similar laser beam but with a much smaller scan line spacing, preferably so as to provide overlap of the scan lines. The scan line spacing is varied by slowing the sweeping motion of mirror 24. Control of the three pivotal motions of mirror 24, i.e., the fast positioning motion, the slower recording motion, and the still slower erasing motion is achieved by giving appropriate command signals to the drive motor 24a.

A display technique for film deformation recording is illustrated in FIG. 2. Light source 60 is imaged onto an adjustable vertical slit 70. The image of the vertical slit 70 is directed through condenser lenses 72 and via beam combiner 66, is directed through recording lens 34, recording medium 36, and projection lens 67, and made to fall on an opaque line provided on a mask 74 positioned just beyond projection lens 67. The deformations forming the recording or recording medium 36 serve to refract light so as to miss the opaque line of mask 74 permitting the light to image the deformation on the screen. Since the recordings are in the form of vertical line strokes, which refract light at right angles to the strokes, the vertical slit-opaque line combination is optimum for passing refracted light through the system. An additional advantage to the system just described is the spatial filtering phenomenon which occurs at the mask 74. Since this mask is at a Fourier transform plane of the recorded data, each recorded line appears on the screen 68 as a group of lines, similar to that of the double-slit diffraction phenomenon described in elementary physical optics courses. This phenomenon serves to suppress the line structure of the image while viewing since each line now becomes a number of lines of somewhat narrower dimension, i.e. harder to visually resolve. A single edge mask also works, but the viewed line is single and somewhat diffuse. The latter case is commonly called "schlieren" readout and is described in more detail in the previously mentioned Carlson application S.N. 585,060.

Control system

Figure 7:
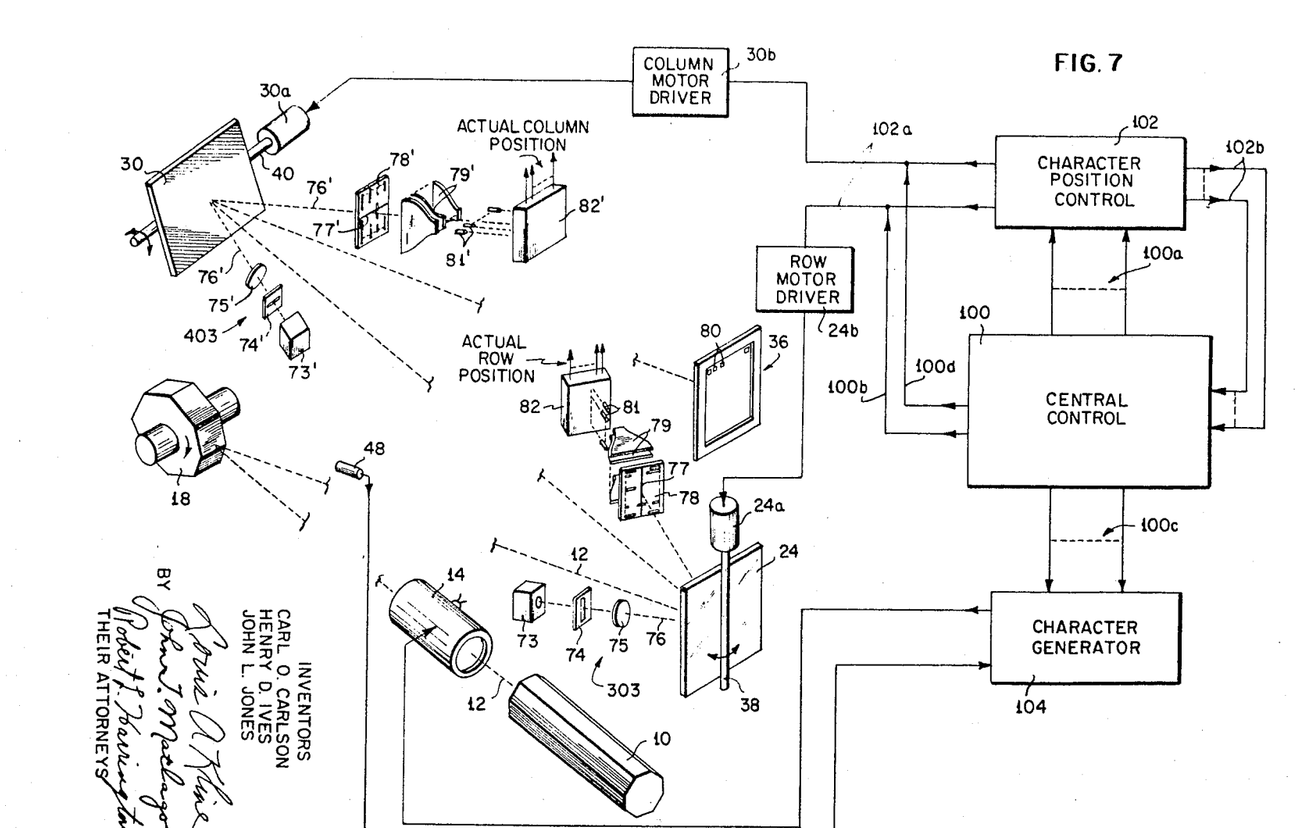
FIG. 7 is a schematic block diagram of the control system for the mirror movements for random selection of the addressable coordinate positions of the recording medium as illustrated in FIG. 4.

A schematic diagram of a control system for the laser recording system is shown in FIG. 7. When a recording is to be made, a central control 100 (e.g., a computer) provides address and control signals, via lines 100a, to a character position control 102, which in response thereto, provides appropriate signals, via lines 102a, to row and column motor drivers 24b and 30b of mirrors 24 and 30, respectively, so as so cause the mirrors to position the laser beam at the starting point of a selected area of the recording medium 36. When character position control 102 indicates to the central control 100, via lines 102b, that the laser beam is properly positioned, the operation of control 102 is disabled. The central control 100 then provides an appropriate raster signal, via line 100b, to row motor driver 24b, while concurrently providing signals indicative of a selected character, via lines 100c, to character generator 104, which in response thereto, and as synchronized by photo diode 48, controls the modulator 14 during the scan of the selected raster area. If a film deformation laser recording system disclosed in the aforementioned patent application S.N. 585,060 is being employed, an erasing of all or a portion of the raster area could be performed as well as the recording of a character. In such an erasing operation, the central control 100 would control character generator 104 and provide signals to drive row motor driver 24b at such a speed that the laser beam provides erasing in the raster area.

The central control 100, the character position control 102 and the character generator 104 of FIG. 7 may be of conventional form. However, to maximize the high speed capability of the system, it is of particular advantage to use the character position control illustrated in FIG. 8.

Before considering the character position control 102 illustrated in FIG. 8, reference will be made to FIG. 9. Curves 901 and 905 in FIG. 9, respectively illustrate the response of conventional under-damped positioning systems, while curve 906 illustrates the improved positioning action achieved by the character position control 102 of FIG. 8. Horizontal line 902 in FIG. 9 indicates an initial position, while horizontal line 903 indicates a desired position to which the laser beam is to be moved. The movement is considered to be complete when the actual position of the laser beam remains within the limits of acceptable departure from the desired position indicated by horizontal lines 904. It will be seen that for the under-damped curve 901, the desired position is first reached at time $T_{uo}$, but because of the stored momentum, it overshoots a considerable distance, followed by oscillations which diminish in amplitude (due to damping of the system), and it is not until time $T_{uf}$ that the laser beam is contained within the acceptable departure limit. Curve 905 illustrates the effect of increasing the damping to the point where the initial overshoot does not exceed the acceptable departure limit. Although the overall response time is somewhat decreased, the time to first zero crossing $T_{do}$ is much increased.

Figure 8:
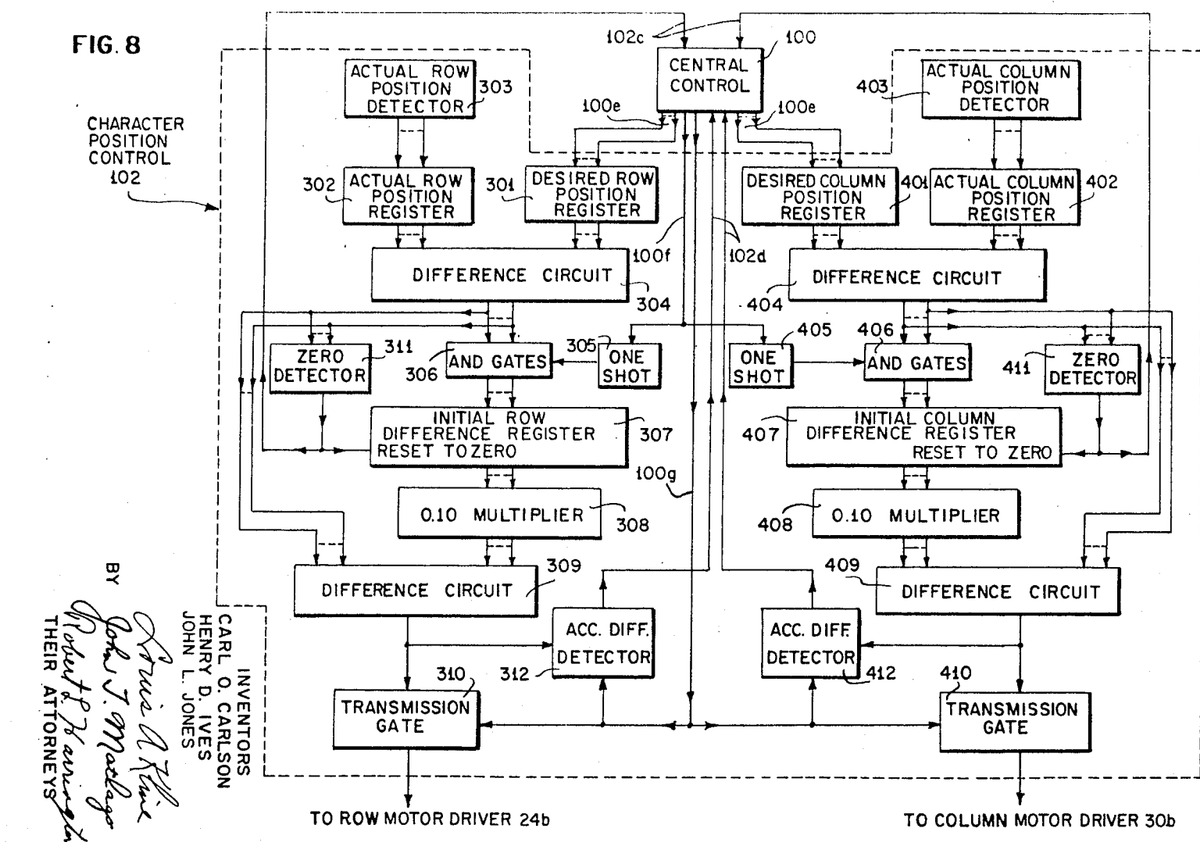
FIG. 8 is a block diagram showing more specifically the electronic system for controlling the mirror movements.

Curve 906 provided by the character position control 102 of FIG. 8 avoids the disadvantages of both curves 901 and 905 by providing a short time to first zero crossing at $T_{co}$ with a small overshoot that remains within the acceptable departure limit. Such a response is achieved by the character position control 102 of FIG. 8 by providing an initial target position 907 for the system which is a predetermined amount, e.g., 10%, less than the desired position 903. Then, when as a result of the overshoot the laser beam reaches the desired position 903 at time $T_{co}$, the target position 907 for the system is automatically altered to correspond to the desired position 903. Thus, the system crosses the desired position at $T_{co}$ with a very small momentum and remains within the acceptable departure limit.

The actual or present row and column laser beam position detectors 303 and 403 will next be described. This detection is determined by detecting the position of mirrors 24 and 30. As shown in FIG. 7, separate light source 73 is used for detecting the position of mirror 24 which provides the actual row position. The optical path of the beam from this source reflects from the mirror 24 at a different angle than the laser beam 12 to avoid mechanical interferences. The line source of light 73, the mechanical slit 74 and the lens 75 combine to project a beam of light 76 which is reflected from the mirror 24 and forms a vertical line of light 77 at the binary code mask 78, which line 77 sweeps horizontally as the mirror 24 rotates. Eight channel areas on the mask appear as horizontal bands having transparent and opaque portions arranged in such a manner that as the line of light sweeps across the mask, the light is clocked or passes through each of the channels in a sequence which produces a binary code. The light which passes through the mask is collected in each channel by a light guide 79 which directs it to a corresponding photodetector 81. The outputs of the photodetectors are amplified and passed into decoding networks 82. The electrical binary code signals from network 82 indicating the actual mirror 24 position are fed to register 302 of FIG. 8. The actual column position detector 403 is obtained by detecting the position of mirror 30 using components similarly described for the row position detector 303 and designated by similar reference numerals bearing a prime, as shown in FIG. 7.

Additional information about the type of position indicators that may be used in the present invention may be found in the articles: Ketchledge, R.W., "Logic for a Digital Servo System," The Bell System Technical Journal, January 1959 pp. 1–17; and Gallaher, L.E., "Beam Positioning Servo System for the Flying Spot Store," The Bell System Technical Journal, March 1959, pp. 425–444.

The construction and operation of the character position control 102 of FIG. 8 will now be described.

Operation of the character position control 102 in FIG. 8 is initiated by the central control 100, via lines 100e (certain of lines 100a) setting desired row and column position registers 301 and 401 to the respective row and column positions to which it is desired that the laser beam be moved. The actual or present row and column positions are then continuously set into actual row and column position registers 302 and 402 by respective actual row and column position detectors 303 and 403.

Concurrently with the setting of row and column position registers 301 and 401 to the desired row and column positions, the central control 100, via lines 100f (certain of the lines 100a), triggers one-shots 305 and 405, which momentarily enable AND gates 306 and 406 for a time sufficient to permit the initial difference between actual and desired row and column positions detected by difference circuits 304 and 404 to be set up in respective initial row and column difference registers 307 and 407. Multipliers 308 and 408 apply one-tenth of the initial row and column differences to respective difference circuits 309 and 409 for subtraction from the differences detected by respective difference circuits 304 and 404. The outputs of difference circuits 309 and 409 will thus be 10% less than the actual row and column differences existing between the present laser beam row and column positions and the desired row and column positions. As a result, the outputs of difference circuits 309 and 409 will, in effect, be pseudo-difference signals which when passed through respective transmission gates 310 and 410 to row and column drivers 24b and 30b (FIG. 7) will cause the laser beam to be driven towards a target position 10% short of the desired position, as illustrated by curve 906 in FIG. 9. Transmission gates 310 and 410 are enabled by the central control 100, via lines 100g (certain of the lines 100a), at the start of the positioning operation.

When the actual row and column positions of the laser beam reach the desired row and column positions set in respective registers 302 and 402 (which may occur at the same or different times), the respective difference circuits 304 and 404 will go to zero, causing triggering of respective zero detectors 311 and 411, which, in turn, act to reset to zero respective initial row and column difference registers 307 and 407. As a result, the outputs of multipliers 308 and 408 will become zero so that the outputs of difference circuits 309 and 409 will now be the real difference signals, producing the advantageous resultant response illustrated by curve 906 in FIG. 9.

The central control 100 is made aware of the arrival of the laser beam within acceptable limits of the desired position, for example, as illustrated by lines 904 in FIG. 9, by applying thereto the outputs of zero detectors 311 and 411 thereto, via lines 102c (certain of lines 102b), as well as the outputs of acceptable difference detectors 312 and 412, via lines 102d (certain of lines 102b), the latter providing signals indicating when the row and column positions of the laser beam are within acceptable limits from the desired position. In response to these signals from zero-detectors 311 and 411 and acceptable difference detectors 312 and 412, the central control 100 appropriately initiates scanning of the selected raster area and operation of character generator 104 (FIG. 7), whereby to cause a selected character to be recorded in the selected raster area to which the laser beam has been rapidly moved by the character position control 102 in the manner described above. Typically, the central control 100 may initiate scanning in response to the first zero crossing following the arrival of the laser beam within acceptable row and column difference limits, as indicated by acceptable difference detectors 312 and 412. When the scanning sweep is initiated, the operation of the character position control 102 is disabled by removing the enabling signal provided by the central control 100, via lines 100g, so as to disable transmission gates 310 and 410.

*Line drawing operating mode*

Figure 11:
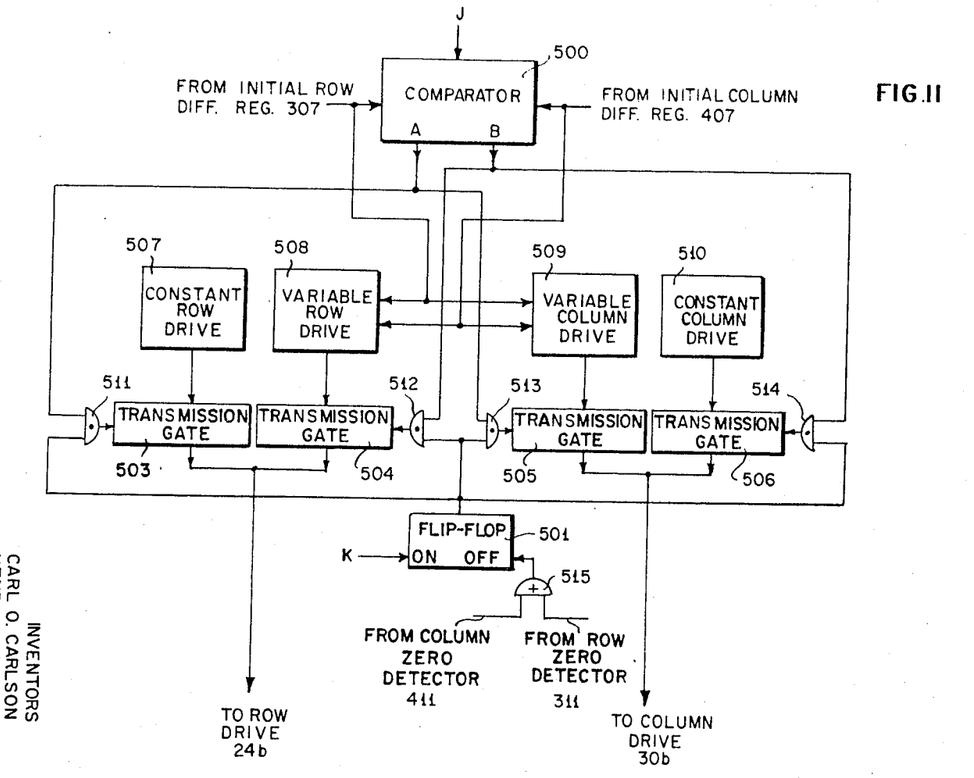
FIG. 11 is a schematic block diagram of an electronic control for producing line drawings on the recording medium of the system illustrated in FIG. 1.

A valuable characteristic for a display is the capability of readily generating a straight line between any two points of the displayed field. FIG. 11 shows how appropriate structure may be provided in the central control 100 for achieving this capability. With reference to FIG. 11, it will be understood that when the line drawing mode of operation is to be provided, no enabling signal is provided on line 100g (FIG. 8) to the character position control 102, so that it is disabled to the extent of not providing signals to the row and column drivers 24b and 30b (FIG. 7). However, operation of other portions of the character position control 102 of FIG. 8 are caused to occur during the line drawing mode so as to permit the output of the initial row and column difference registers 307 and 407 and the zero detectors 311 and 411 (FIG. 8) to be used in the line drawing mode portion of the central control 100, as illustrated in FIG. 11. The starting point for the line drawing mode is determined by the actual or present position of the laser beam, which may be positioned to any desired initial position in the manner described above.

It will be seen from FIG. 11 that the outputs of the initial row and column difference registers 307 and 407 are applied to a comparator 500 which, when the system is in the line drawing mode, as indicated by signal J, causes only output A to provide an enabling signal if the initial row difference is greater than the initial column difference, or only output B to provide an enabling signal if the initial column difference is greater than the initial row difference. Flip flop 501 is turned on by a pulse K to enable AND gates 511 to 514 each time the system enters the line drawing mode. Accordingly, when the initial row difference is greater than the initial column difference, output A will enable transmission gates 503 and 505, via respective AND gates 511 and 513, so as to cause the output of constant row drive 507 to be applied to row driver 24b, via lines 100b in FIG. 7, while the output of variable column drive 509 is applied to column driver 30b, via lines 100d in FIG. 7; conversely, when the initial column difference is greater than the initial row difference, output B will enable transmission gates 504 and 506, via AND gates 512 and 514, to cause row driver 24b to receive the output of variable row drive 508, while column driver 30b receives the output of constant column drive 510.

The constant row and column drive 507 and 510 in FIG. 11 are chosen so that the maximum possible velocity of the laser beam during the line recording mode never exceeds the maximum recording speed capability of the recording medium. Upon consideration, it will be understood that if the maximum permissible laser beam recording velocity is $v$, the maximum allowable recording velocity in either the row or column direction is $v/\sqrt{2}$. This value is obtained because the maximum laser beam velocity will occur for the condition when the initial row and column differences are equal, for which condition a velocity of $v/\sqrt{2}$ in each direction will produce a resultant laser beam velocity equal to the maximum allowable recording velocity $v$. Thus, the constant row and column drives 507 and 510 in FIG. 11 are chosen to provide a constant velocity equal to $v/\sqrt{2}$.

It will be understood that, in order to provide straight line movement of the laser beam between initial and final positions, each of the row and column drive 508 and 509 in FIG. 11 is constructed and arranged to operate in response to the initial row and column differences applied thereto to provide a drive signal to its respective row or column driver 24b or 30b (FIG. 7) which will cause travel to the desired final position in its respective row and column direction to be completed in the same period that travel in the other direction is completed under the constant drive. If other than straight line movement is desired, the variable row and column drives 508 and 509 are constructed and arranged to provide output signals accordingly. During the line recording mode, the character generator 104 in FIG 7 is suitable controlled by the central control 100, via lines 100c, to in turn control modulator 14 so as to cause the laser beam to record as it travels between initial and final positions. Also, during the line drawing mode, the central control 100 causes solenoids 56 and 57 in FIG 3 to be operated so as to thereby eliminate vertical oscillation of the laser beam as the line is being drawn.

The triggering of either zero detector 311 or 411 in FIG. 8 is used to indicate the completion of the line drawing operation, which is implemented in FIG. 11 by feeding the outputs of zero detectors 311 and 411 to the off input of flip flop 501 vit OR gate 515. When flip flop 501 turns off, AND gates 511 to 514 are disabled, which in turn disable transmission gates 503 to 560 to thereby disconnect the structure of FIG. 11 from row and column drivers 24b and 30b.

*Character decode*

A single recording medium 36 may contain as many as several thousand image areas such as illustrated in FIGS. 4 and 5. It is thus desirable to provide a fast electrical readout system whereby information that is recorded on the recording medium can be quickly located and readout to be used, for example, in a computer system.

A simplified means for electrical readout of the re-recorded images is shown in FIGS. 4 and 10 wherein each symbol of the image is accompanied by a code bar pattern 84. The code bar pattern 84 as illustrated includes a double bar thickness to indicate the start of each character followed by a single bar thickness of varying lengths to identify the specific character in a manner conventional within the art. When the character generator is set for Readout Mode, the laser beam intensity is reduced below the writing threshold. The position control circuit indexes the laser beam to the desired position and scans through a character raster. In the recording system where the image areas are transparent in an opaque background, wherever light passes through the recording medium it is collected by the projection lens 67 (shown in FIG. 1) and a portion thereof is reflected off dichroic beam-splitter 86 into a multiplier photube in a character select register forming a part of the character decode circuit receives the electrical signal from phototube 90 and also scan information from the character generator. Internal logic allows the decode circuit to examine only signals from the code bar pattern 84 and ignore signals concerning the rest of the character. The code bars are checked for redundancy and a parity check is made. The decoded characters are then stored in a character select register forming a part of the character generator.

The recording medium

An example of a suitable recording medium for recording information in the form of medium deformations (to be readout by the optics projection system disclosed previously) is described in the above-mentioned copending Carlson application, Ser. No. 585,060. An example of a recording medium suitable for the process of bright trace recording on a dark background is set forth in the other of the above-mentioned copending applications, to wit; Carlson et al., Ser. No. 549,281. For this latter process, evaporated bismuth is a preferred coating for the recording medium. A bismuth coating having an optical density of 0.6 gives the desired results when the particular application requires the coating to be partially light transmissive. Where an opaque coating is desired, a bismuth coating having an optical density of 2 is used. Other available materials are, however, suitable for use with this process of recording.

Another suitable material provides for either dark or bright trace recording on a colored background. The selection of dark or bright trace recording is achieved by adjustment of the laser beam intensity. Suitable coatings for the recording media are set forth in the following examples.

Example I

| Item: | Weight, percent |
|---|---|
| Brilliant Green—Color Index No. 42040 | 1 |
| Cellulose nitrate | 5 |
| Dioctyl phthalate | 1 |
| Amyl acetate | 47 |
| Ethanol | 46 |

This mixture is applied on a suitable substrate, e.g., Type D Mylar from E.I. du Pont de Nemours and Company to form theron a two micron-thick coating when dry. The dry coating from this solution is highly efficient in absorbing the 6,328 angstrom wavelength. For clear traces, a writing speed for the laser beam of 2.4 meters per second with 17 millwatts intensity in a two micron spot at the medium's surface is adequate. Reduction of the beam intensity at the medium's surface to 9 milliwatts with the same scanning velocity and spot size produces a dark trace recording.

Example II

| Item: | Weight, percent |
|---|---|
| Crystal Violet Dye—Color Index No. 42555 | ½ |
| Cellulose nitrate | 5 |
| Dioctyl phthalate | 1 |
| Amyl acetate | 47 |
| Ethanol | 46½ |

This mixture is also applied on a suitable substrate to form thereon a two-micron-thick coating when dry. This coating exhibits clear trace recording at 2.4 meters per second with 24 milliwatts in a 2 micron spot at the medium surface. Dark trace recording is achieved at 12 milliwatts with the same recording spot size and spot velocity.

What is claimed is:
1. A display system wherein a laser beam produces an optical change in selected portions of a recording medium to thereby form a recording of data thereon that can be projected onto a viewing screen, comprising: means providing a laser beam, optical means for directing the laser beam onto a recording medium, and means for amplitude modulating said laser beam in accordance with a desired recording to be produced on the recording medium, said optical means including the improvement whereby a first deflection means provides for lateral displacement of the laser beam, a second deflection means provides for vertical displacement of the laser beam, said first and second deflection means being cooperative to position the laser beam at a selected portion of the recording medium, and whereby a third deflection means provides a vertical scanning movement of the laser beam to produce short repetitive vertical scan lines sufficient to cover the height of the desired data to be recorded, and means effective upon positioning of the laser beam to produce a raster of scan lines across said selected portion.

2. A display system wherein a laser beam produces an optical change in selected portions of an optical field of a recording medium to thereby form a recording that can be projected onto a viewing screen as defined in claim 1 wherein said first deflection means comprises a first polygon mirror adapted for rotative movement about a substantially vertical axis, said first polygon mirror having a plurality of mirror faces and means providing a vertical advancement of the projected laser beam as the successive mirror faces move into the path of the beam, a second polygon mirror adapted for rotative movement about a horizontal axis to provide the vertical scanning movement of the laser beam, said first and second polygon mirrors adapted for cooperative movement whereby a raster of the scan lines produced by the second polygon mirror is swept across the optical field by each of the successive mirror faces of the first polygon mirror.

3. A display system for rapidly producing miniaturized recordings on a recording medium whereby as many as several thousand characters can be recorded at a rate greater than a hundred characters per second and which characters can be light projected from the recording medium for visual display onto a large size viewing screen, comprising: means providing a laser beam, optical means for directing the laser beam onto the recording medium, and means for amplitude modulating said laser beam in accordance with a desired recording to be produced on the recording medium, said optical means including the improvement whereby a first deflection means provides for lateral displacement of the laser beam, and a second deflection means provides for vertical displacement of the laser beam, control means, said first and second deflection means being responsive to said control means for rapid controlled positioning of the laser beam at an addressable coordinate position of the recording medium, a third deflection means providing vertical scanning movement of the laser beam to produce short repetitive vertical scan lines sufficient to cover the height of the desired miniature characters, and means for causing said scan lines produced by said third deflection means to move across the portion of the medium identified by said coordinate position for producing the desired recording thereon.

4. A display system wherein a laser beam produces an optical change on a recording medium to thereby form a recording thereon that can be projected onto a viewing screen, comprising: means providing a laser beam, optical means for directing the laser beam at the recording medium, and means for amplitude modulating said laser beam in accordance with a desired recording to be produced on the recording medium; said optical means including the improvement whereby a first mirror is pivotally mounted for controlled vertical displacement of the laser beam and a second mirror is pivotally mounted for controlled horizontal displacement of the laser beam, the rotative positioning of said first and second mirrors being controlled to locate the projected beam at an addressable coordinate point of a selected portion of the recording medium, a rotatably driven polygon mirror positioned in the path of the laser beam to cause short repetitive scan lines on the recording medium, and means for causing said scan lines produced by the polygon mirror to move across said selected portion for producing the desired recording.

5. A display system wherein a laser beam produces an optical change in a recording medium to thereby form a recording thereon that can be projected onto a viewing screen as defined in claim 4 including means for synchronizing the scaning motion produced by the polygon mirror with the amplitude modulating means comprising a light guide positioned to sense the projected laser beam at the uppermost position of its scanning movement, a character generator for generating signals representative of a character to be supplied to said modulating means, and a photo diode sensitive to light exposure from the light guide to produce a scan sync pulse that is conveyed to synchronize the operation of said character generator with the scanning of said optical means.

6. A display system wherein a laser beam produces an optical change in a recording medium to thereby form a recording that can be projected onto a viewing screen as defined in claim 4, including bypass means having a first mirror adapted for retractable insertion into the path of the laser beam before said laser beam is received by the polygon mirror, and said bypass means including return means for directing the laser beam back into its original path at a point after the polygon mirror.

7. A display system wherein a laser beam produces an optical change in a recording medium to thereby form a recording that can be projected onto a viewing screen as defined in claim 6, wherein said return means includes a stationary mirror for receiving the beam reflected from the first mirror and for reflecting said beam toward the original beam path at a point after the polygon mirror, and a second retractable mirror positioned at said point to reflect the beam back into its original path.

8. A display system wherein a laser beam produces an optical change in a recording medium to thereby form a recording thereon that can be projected onto a viewing screen as defined in claim 4 including, means for synchronizing the scanning motion produced by the polygon mirror with the amplitude modulating means comprising a light guide positioned to intercept the laser beam at some point in its scanning movement, and a photo diode responsive to light exposure from the light guide to produce a scan sync pulse for the amplitude modulating means.

9. A display system wherein a laser beam produces an optical change in selected portions of a recording medium to thereby form a recording that can be projected onto a viewing screen as defined in claim 4 including a projection light source, means for projecting a light beam from said light source through the recording medium, and a projection lens system projecting the light beam after it has passed through the recording medium onto a viewing screen.

10. A display system wherein a laser beam produces an optical change in the selected portions of a recording medium to thereby form a recording that can be projected onto a viewing screen as defined in claim 9 wherein, said optical change is produced by forming a deformation pattern on the recording medium, said means for projecting the projection light source including means forming the light beam into a line light beam, and means for focusing the unimaged portion of the light beam after it passes through the projection lens system onto an opaque line with the deformation pattern formed on the recording medium deflecting the light passed therethrough to miss the opaque line and thereby become projected onto the viewing screen.

11. A display system wherein a laser beam produces an optical change in selected portions of a recording medium to thereby form a recording that can be projected onto a viewing screen as defined in claim 10 including means for erasing the deformation pattern recorded on said recording medium.

12. A display system wherein a laser beam produces an optical change in selected portions of a recording medium to thereby form a recording that can be projected onto a viewing screen as defined in claim 9 including means to provide electrical readout of information recorded on the recording medium, said means including scanning means for scanning the pattern representing that recorded information, and sensing means responsive to said scanning means for sensing the pattern of the recorded information and thereby provide electrical signals identifying the invention.

13. A display system wherein a laser beam produces a recording on a recording medium for optical projection onto a viewing screen comprising: means for producing a laser beam, deflection means for controlling the direction of the laser beam, a position control means for controlling the deflection means to direct the laser beam at selected addressable coordinate positions on the recording medium, compensating means forming a part of the position control means to minimize overshoot oscillation of the projected laser beam in its rapid movement from one addressable coordinate position to another, said compensating means providing a pseudo position signal to be given initially to the deflection means that is a predetermined distance short of the desired position, said predetermined distance being the approximate amount of overshoot that the beam will move beyond said pseudo position, and means correcting the pseudo position signal to the desired position when the projected beam crosses an established point near the desired position.

14. A display system for rapidly producing miniaturized recordings on a recording medium whereby as many as several thousand characters can be recorded at a rate greater than a hundred characters per second and which characters can be light projected from the recording medium for visual display onto a large size viewing screen comprising: means for producing a laser beam, means for causing said laser beam to scan a selective portion of the recording medium, a vertical positioning mirror and a horizontal positioning mirror for controlling the projection of the laser beam, a poistion control means for controlling each of the horizontal and vertical positioning mirrors to selectively position the laser beam at an addressable coordinate position on the recording media, said position control means including a position detect means that detects the actual position of the mirror, a difference register that continuously registers the difference between the actual mirror position and a desired mirror position, drive means adapted to respond to a difference signal for changing the actual position of the mirror to correspond to the desired position as indicated by said difference signal, compensating means to compensate for a calculated momentum overshoot of the mirror that includes means for substracting from the difference of the difference register a predetermined percentage of the initial difference registered in the difference register with the modified difference being conveyed as the difference signal to the drive means, and zero detect means for detecting when the difference of the difference register equals zero, said compensating means being responsive to said zero detect means to cancel out the substracted percentage difference and provide the drive means with a difference signal indicating the true difference registered in the difference register.

15. In a display system wherein a laser beam produces a recording on a recording medium for optical projection onto a viewing screen, position control means comprising, means for attaining rapid movement of the laser beam from an initial addressable two-coordinate position to a desired addressable two-coordinate position on said recording medium, said means providing a pseudo position signal to initially direct the laser beam on the recording medium to a pseudo target position which in each coordinate direction is a respective predetermined distance short of the desired position, said predetermined distance being slightly less than the amount of overshoot of the beam in the respective coordinate direction, and means correcting the pseudo position signal to the desired position to thereby direct the laser beam to the desired position when the projected beam crosses an established point near the desired position.

16. A display system wherein a laser beam produces a recording on a recording medium for optical projection onto a viewing screen comprising: means for producing a laser beam, deflection means for controlling the direction of the laser beam, position control means for controlling the deflection means to direct the laser beam at selected addressable coordinate positions on the recording medium, compensating means forming a part of the position control means to minimize overshoot oscillation of the projected laser beam in its rapid movement from one addressable coordinate position to another, said compensating means providing a pseudo position signal to be given initially to the deflection means that is a predetermined distance short of the desired position, said predetermined distance being the approximate amount of overshoot that the beam will move beyond said pseudo position, and means correcting the pseudo position signal to the desired position when the projected beam crosses an established point near the desired position, wherein said position control means includes means for readily generating a straight line between two points identified by $x,y$ coordinate positions on the recording medium, said means including for each of the $x,y$ coordinate positions a constant drive and a variable drive, means responsive to a positioning signal to determine the greater distance between the $x$ coordinate movement and the $y$ coordinate movement, means to engage the movement for the longer coordinate movement with the constant drive, means to determine the ratio of the distances of the shorter coordinate movement with the greater coordinate movement, means to establish an equivalent ratio for the speed of the variable drive for the shorter coordinate positioning means with the speed of the constant drive for the greater coordinate positioning means, and means to engage the shorter coordinate positioning means with said variable drive.

References Cited
UNITED STATES PATENTS

| | | | |
|---|---|---|---|
| 3,181,170 | 4/1965 | Akin | 346—108 |
| 3,322,033 | 5/1967 | Silverman | 88—24 |
| 3,351,948 | 11/1967 | Bonn | 346—76 |

RICHARD B. WILKINSON, *Primary Examiner.*

JOSEPH W. HARTARY, *Assistant Examiner.*

U.S. Cl. X.R.

178—6.7; 340—173; 346—76, 108

UNITED STATES PATENT OFFICE
CERTIFICATE OF CORRECTION

Patent No. 3,448,458

June 3, 1969

Carl O. Carlson et al.

It is certified that error appears in the above identified patent and that said Letters Patent are hereby corrected as shown below:

Column 8, line 12, "clocked" should read -- blocked --. Column 10, line 48 "vit" should read -- via --. Column 11, line 4, "in a character select register forming a part of the" should read -- totube 90. In a manner well-known to the art, a --; Column 11, line 52, "millwatts" should read -- milliwatts --. Column 14, line 46, "poistion" should read -- position --.

Signed and sealed this 21st day of April 1970.

(SEAL)
Attest:

Edward M. Fletcher, Jr.
Attesting Officer

WILLIAM E. SCHUYLER, JR.
Commissioner of Patents